United States Patent
Rooshenas

(10) Patent No.: US 7,169,462 B1
(45) Date of Patent: Jan. 30, 2007

(54) WATERPROOFING MEMBRANE

(75) Inventor: Rezvan Rooshenas, Hamden, CT (US)

(73) Assignee: Laticrete International, Inc., Bethany, CT (US)

( * ) Notice: Subject to any disclaimer, the term of this patent is extended or adjusted under 35 U.S.C. 154(b) by 410 days.

(21) Appl. No.: 10/791,525

(22) Filed: Mar. 1, 2004

(51) Int. Cl.
*B32B 27/04* (2006.01)
*B32B 27/38* (2006.01)
*B32B 27/40* (2006.01)
*B05D 3/02* (2006.01)
*C08L 63/00* (2006.01)

(52) U.S. Cl. .......... 428/297.4; 428/413; 428/423.1; 427/386; 525/528

(58) Field of Classification Search ............. None
See application file for complete search history.

(56) References Cited

U.S. PATENT DOCUMENTS

| | | | |
|---|---|---|---|
| 3,603,221 A | 9/1971 | Barton et al. | |
| 4,151,025 A | 4/1979 | Jacobs | |
| 4,608,404 A * | 8/1986 | Gardner et al. | 523/400 |
| 4,775,567 A | 10/1988 | Harkness | |
| 4,789,578 A | 12/1988 | Twyford et al. | |
| 4,855,339 A | 8/1989 | Saito et al. | |
| 4,882,216 A | 11/1989 | Takimoto et al. | |
| 4,900,608 A | 2/1990 | Stamper | |
| 5,033,488 A | 7/1991 | Curtis et al. | |
| 5,320,871 A | 6/1994 | Agro et al. | |
| 5,496,615 A | 3/1996 | Bartlett et al. | |
| 5,542,218 A | 8/1996 | Rompel | |
| 5,667,893 A | 9/1997 | Kinzer et al. | |
| 5,891,367 A | 4/1999 | Basheer et al. | |
| 5,935,683 A | 8/1999 | Iiyama et al. | |
| 6,277,903 B1 | 8/2001 | Sophiea et al. | |
| 6,322,848 B1 | 11/2001 | Phenis et al. | |
| 6,353,043 B1 | 3/2002 | Rice et al. | |
| 6,395,845 B1 | 5/2002 | Weinmann et al. | |
| 6,423,805 B1 | 7/2002 | Bacho et al. | |
| 6,448,317 B1 | 9/2002 | Kaiser et al. | |
| 6,489,405 B1 | 12/2002 | Beisele | |
| 6,500,912 B1 | 12/2002 | Corley | |
| 6,528,120 B2 | 3/2003 | Brown | |
| 6,528,563 B2 | 3/2003 | Kaiser et al. | |
| 6,538,052 B2 | 3/2003 | Scherzer et al. | |
| 2003/0196753 A1 * | 10/2003 | Schoenfeld et al. | 156/330 |

OTHER PUBLICATIONS

"Industrial polymers, major." Encyclopædia Britannica. 2006. Encyclopædia Britannica Online. Nov. 13, 2006 <http://www.search.eb.com/eb/article-76475>.*

*Jamo Quality Tile Setting Materials, Products Waterproof,* Jun. 30, 2003, pp. 1-4, http://www.jamoinc.com/prodwaterproof.htm.

* cited by examiner

*Primary Examiner*—Michael J. Feely
(74) *Attorney, Agent, or Firm*—DeLio & Peterson, LLC

(57) ABSTRACT

A waterproofing membrane composition is provided which is strong, easy to use, trowelable, flexible, passes negative hydrostatic test ASTM D4068 and which can be flood tested after 24 hours @ 70° F. of application. The waterproofing membrane composition contains a flexible polymer, preferably an epoxy containing polyether chains formed from a glycol, a flexible curing agent, sand, and an aramid fiber. The epoxy component also preferably includes an epoxy flexibilizer and a reactive diluent for epoxy chain termination. A p-aramid fiber is preferred and it is highly preferred to use the polymer fiber in a pulp form which has a fibrillated structure.

11 Claims, No Drawings

WATERPROOFING MEMBRANE

BACKGROUND OF THE INVENTION

1. Field of the Invention

The present invention relates to waterproofing membranes for installing tile, stone and other masonry products over surfaces including concrete, masonry, brick and plywood, and, in particular, to a high performance, strong, flexible, trowel applied waterproofing membrane for fast turnaround projects which can be flood tested in 24 hours and which does not require fabric reinforcement.

2. Description of Related Art

Water is known as one of the most destructive elements when it is not properly controlled and all structures which may come into contact with water must typically be protected from water seepage. A waterproofing membrane is used to prevent water seepage to the underlying structure and typical structures requiring waterproofing are bridge surfaces, roads, roofs, and the like. Other structures which must be protected against water seepage are swimming pools, fountains, shower pans and stalls, tubs, bathrooms, laundries, kitchens and food processing areas. Some applications require protection for both interior and exterior use.

For convenience, the following description will be directed to ceramic tile installations where the ceramic tile comes into contact with water and a waterproofing membrane is used to protect the underlying structure. For this type application, a waterproofing membrane is used over concrete, masonry, terrazzo, cement backer boards, gypsum boards (interior wall use only) and exterior grade plywood. Conventionally, the underlying substrate is overlaid with a fluid applied waterproofing membrane, covered with a reinforcing fabric and then overlaid with another layer of the fluid waterproofing membrane. Other methods employ a waterproofing membrane sheet. A mortar, typically a thin set mortar, is then applied over the waterproofing membrane surface and provides the base for installing ceramic tile. A grout is then used between the openings in the ceramic tile.

While the waterproofing membrane must of course provide a suitable waterproofing barrier, the waterproofing membrane must have other properties in order to be effective. For example, the waterproofing membrane should be strong, flexible to cover cracks in the substrate and not crack itself, be easy to apply and allow for rapid installation for fast turnaround projects. One of the most important properties is that the applied waterproofing membrane can be flood tested after 24 hours at 70° F. For this test the installer applies the waterproofing membrane and after 24 hours, a head of water (typically 10–12 inches) is placed on the membrane and the head is checked to determine if the waterproofing membrane is impermeable. Another important property is to pass ASTM D4068 which is a negative hydrostatic test under 2 feet of water. It is also preferred that the waterproofing membrane not require fabric at coves, drains or base or anywhere and can bridge gaps at least up to ⅛ inch. It is also important that the waterproofing membrane adhere to pipes and drains such as cast iron and lead. The waterproofing membrane should also have a tensile strength of at least 800–1200 psi and have an elongation of at least 30–50%.

The term "tile" will be used herein to refer to masonry products in general such as stone, bricks, pavers, and the like and the term "mortar" will be used herein to refer to thin-set mortars, medium bed mortars, underlayment or leveling mortars and grouts and pointing mortars.

It is known to incorporate fillers in waterproofing membranes as shown in U.S. Pat. No. 6,528,563 but Applicant is unaware of a waterproofing membrane which may be trowel applied and flood tested after 24 hours.

Bearing in mind the problems and deficiencies of the prior art, it is therefore an object of the present invention is to provide an improved waterproofing membrane composition having enhanced overall application and performance properties, can be trowel applied at variable thicknesses, can be flood tested after 24 hours of application, pass ASTM D4068, not require any fabric, bridge gaps of up to ⅛ inch and adheres to materials such as cast iron and lead, metals without aid of another adhesive.

It is another object of the present invention to provide a method for making an improved waterproofing membrane composition and a method for using the waterproofing membrane composition of the invention.

Still other objects and advantages of the invention will in part be obvious and will in part be apparent from the specification.

SUMMARY OF THE INVENTION

The above and other objects, which will be apparent to those skilled in art, are achieved in the present invention which relates in one aspect to an improved waterproofing membrane composition which is strong, workable and easy to apply, flexible, passes ASTM D4068 and cures quickly allowing for flood testing after 24 hours at 70° F. comprising:

- a flexible epoxy resin, preferably including a glycol glycidyl ether such as polypropyleneglycol glycidyl ether;
- a curing agent preferably a polyamine and most preferably a flexible polyamine such as a polyetherpolyamine;
- optionally and preferably an epoxy flexibilizer which is reacted when cured with the resin and the amine curing agent and which is preferably an acrylate functional urethane resin;
- optionally and preferably an epoxy reactive diluent used to reduce the viscosity of epoxy resin systems by molecular weight chain termination, preferably an aliphatic glycidyl ether;
- sand or other inert filler;
- optionally ground rubber or other flexible filler; and
- an effective amount of a poly (p-phenylene terephthalamide) polymer fiber ("p-aramid") and/or poly(m-phenylene isophthalamide) polymer fiber ("m-aramid"), preferably a fibrillated p-aramid polymer.

In another aspect the waterproofing membrane composition of the invention is applied to surfaces to form a waterproofing membrane surface as a base for tiling the substrate.

In a further aspect the waterproofing membrane composition of the invention can be used with a fabric or other such material to enhance the properties of the composition.

DESCRIPTION OF THE PREFERRED EMBODIMENT(S)

The waterproofing membrane of this invention is useful for installing ceramic tiles, brick, ceramic mosaic, marble, quarry tile, slate, pavers or stone over surfaces including concrete, masonry, brick, gypsum wallboard, gypsum plastic, cement backer board, plywood, tile and stone.

Typically the waterproofing membrane composition comprises, in weight %:
- a flexible epoxy resin in an amount of about 2 to 40%, preferably 5 to 20%;
- an epoxy curing agent in an amount sufficient to react with all the epoxide groups and typically in an amount of about 10 to 50%, preferably 10 to 20%;
- an epoxy flexibilizer in an amount up to about 5%, preferably 0.5 to 1.5%;
- an epoxy reactive diluent in an amount up to about 5%, preferably 0.5 to 1.5%;
- sand or other inert filler in an amount up to about 70%, preferably 40 to 65%;
- ground rubber or other flexible filler in an amount up to about 2%, preferably 0.1 to 1.5%;
- precipitated $CaCO_3$ with a wax coating in an amount up to about 3%, preferably 0.1 to 1.5%; and
- an aramid fiber in an amount of about 0.01 to 2%, preferably 0.1 to 0.5%;

Before installing the waterproofing membrane composition over a surface to be protected, certain steps are preferably taken to ensure proper installation. The surface temperature of the substrate should be between about 45–90° F. (7–32° C.) during application and for 24 hours after installation. All substrates should be structurally sound, clean, and free of dirt, oil, grease, loose/peeling paint, laitance, efflorescence, concrete sealers or curing compounds. Installation may be made on a damp surface and new concrete slabs should be damp cured a minimum of 14 days before application.

The waterproofing membrane composition is preferably supplied as a three-compound system with Part A containing the epoxy curing agent, Part B containing the epoxy resin, epoxy flexibilizer and epoxy reactive diluent and Part C containing the other components including the sand, ground rubber, precipitated calcium carbonate, aramid fiber and other components such as a colorant.

To preferably form the working composition, Part A is mixed with Part B for about 30 seconds or more preferably with a low speed drill until thoroughly mixed and uniform. Part C is then added and mixed for about one minute or more until evenly dispersed in the liquid. The mixed product is now ready to apply.

It is preferred to apply the product to the substrate using a 3/16 inch×5/32 V notched trowel. The trowel gauges the appropriate amount of material onto the surface using the V notch side. Once the material is applied, the flat side of the trowel is used to "knock down" or flatten all ridges to produce a smooth flat surface. Any pin holes or areas not covered by the material should be covered the same day or the next day. All 90° angles at coves and corners should be properly filled.

Any suitable flexible resin can be used to make the waterproofing membrane composition. Flexible epoxy resins as used herein refer to epoxy resins having elastomeric chains in the backbone. Representative of such elastomeric chains are polyether chains which are preferably prepared from one or more alkylene oxides. Representative examples of these flexible epoxy resins are those described in U.S. Pat. No. 5,308,895 at column 8, line 9 and formula 9 and the description thereof following and the relevant portions of such description are incorporated herein by reference. Preferably the flexible epoxy resin contains in its backbone ethylene oxide, propylene oxide or a mixture thereof.

Any suitable flexible epoxy resin may be used but it is preferred to use a low viscosity epoxy resin based on a glycol structure such as polypropyleneglycol. These epoxy resins lower the viscosity and increase flexibility and impact resistance of the waterproofing membrane composition. A preferred low viscosity epoxy resin is Araldite DY 3601 supplied by Vantico Inc., Brewster, N.Y. Araldite DY 3601 is a polypropyleneglycol glycidyl ether (CAS Number 9072-62-2) having an epoxy value, eq./kg of 2.47–2.60, an epoxy equivalent, g/eq. of 385–405 and a viscosity at 25° C. (mPas) of 42–52. The common name is Polypropyleneglycol Glycidyl Ether and its chemical name Oxirane, (Chloromethyl)-polymer with alpha-hydro omega-hydroxypoly[oxy(methyl-1,2 ethanediyl)].

Another suitable low viscosity epoxy resin is Araldite 302-2 which is a mixture of 20% Bisphenol A and 80% Bisphenol F.

The flexible epoxy resin component includes epoxies of the polymeric type and can be aliphatic, cycloaliphatic, aromatic or heterocyclic. These materials generally have, on the average, at least 1.5, preferably at least 2 polymerizable epoxy groups per molecule. The polymeric epoxies include linear polymers having terminal epoxy groups (for example, a diglycidyl ether of a polyoxyalkylene glycol), polymer skeletal oxirane units (for example, polybutadiene polyepoxide) and polymers having pendant epoxy groups (such as a glycidyl methacrylate polymer or copolymer). The epoxies may be pure compounds but are generally mixtures containing one, two or more epoxy groups per molecule. The molecular weight of the epoxy compound may vary from 130 to 4,000 or more. Mixtures of various epoxy compounds can be used.

Epoxy-containing materials that are particularly useful include those based on glycidyl ether monomers of the formula:

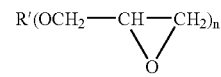

where R' is alkyl or aryl and n is an integer of 1 to 6. Examples are di- or polyglycidyl ethers of polyhydric phenols obtained by reacting a polyhydric phenol with an excess of chlorohydrin such as epichlorohydrin. Such polyhydric phenols include resorcinol, bis(4-hydroxyphenyl)methane (known as bisphenol F) and 2,2-bis(4-hydroxyphenyl)propane (known as bisphenol A). Araldite 302-2 is preferred because of its demonstrated effectiveness and it is highly preferred to use a mixture of Araldite 302-2 and Araldite DY 3601 as the flexible epoxy resin component. It is preferred to use an excess of the Araldite 302-2 such as, a weight ratio of Araldite 302-2 to Araldite DY 3601 of about 6:1 to 1:1, preferably about 5:1 to 2:1, e.g., 4:1.

The composition of the invention includes a curing agent for curing the epoxy ingredients and is used in an amount to cure all the epoxy groups. The curing agent may be any suitable epoxy hardener and it is preferred to use a flexible curing agent having an elastomeric backbone such as a polyether polyamine. The preferred curing agent is Aradur 76 which is a formulated polyether polyamine characterized by $H^+$ Active equivalent, g/eq. of 250, an amine value mg KOH/g 160–190 and a viscosity at 25° C. of 1,100–1,900 mPas. Aradur 76 is supplied by Vantico, Inc. and contains CAS No. 25154-52-3 (nonyl phenol), CAS No. 25620-58-0 (Trimethylhexamethylene diamine), CAS No. 6178846-3 (Tetradecylamine) and CAS No. 90-72-2 (2,4,6-Tris(Dimethyl aminoethyl)) phenol. Likewise, Aradur 70 or other suitable curing agent may be used.

Any suitable epoxy flexiblizer (modifier) may optionally be used and it is preferred to use a reactive moderate viscosity acrylate functional urethane resin sold by Air Products as Ancarez 2364. The urethane resin provides the flexibility. Ancarez 2364 is characterized by having a viscosity at 77° F. (poise) of 250–350, an acrylate double bond as a primary functional reactive group and an equivalent weight of 458–480. Ancarez 2364 also contains about 30% Bisphenol A diglycidyl ether resin.

A reactive diluent material such as a mono-functional epoxide (e.g., tertiary butyl glycidyl ether) may optionally be used to reduce the viscosity of the epoxy system and a preferred reactive diluent is an aliphatic glycidyl ether sold by Air Products Chemicals, Inc. as Epodil 748. This product is a monofunctional reactive diluent which causes molecular chain termination and is used in the minimum amount necessary to achieve the desired viscosity reduction. Epodil 748 has CAS No. 68609-97-2 and is an alkyl C12–C14 glycidyl ether.

The filler component may be any suitable inert filler but sand is preferred. The sand typically has a particle size up to about 2 mm, preferably about 1.5 mm. Other inert fillers include $CaCO_3$ and talc.

Ground rubber or other suitable flexible filler component is optionally used in the composition to provide flexibility and workability. The preferred ground rubber is SBR Rubber Granules (cured) sold by Sparton Enterprises, Inc. of Barberton, Ohio. The rubber contains 40–55% NR (CAS No. 9003-31-0), 27–33% HAF Black (CAS No. 1333-864), 10–20% Oil (Softener) (CAS No. 64742-52-5), 1–5% Stearic Acid (CAS No. 00057-114), 1–5% Zinc Oxide (CAS No. 01314-13-2) and 1–5% Sulfur (CAS No. 07704-34-9). 100% passes #20 sieve and 95–100% passes a #30 sieve.

Another preferred optional component to improve performance properties such as non-sag is ULTRAFLEX® which is precipitated $CaCO_3$ with a stearic-wax coating.

Other components such as a colorant like Titanox® R-KB-2 may be used in the composition.

The novel waterproofing membrane compositions of the invention may also contain optional additives conventionally utilized in these type of compositions. These include, but are not limited to, defoamers, coloring agents, odor masks such as perfumes, and polymers to enhance performance properties. It should be understood that for purposes of the present invention, any conventional additive for waterproof membranes may be optionally provided in the novel compositions of the invention.

This invention provides waterproofing membrane compositions having enhanced overall performance properties such as strength, flexibility, ease of application including trowel application, can be flood tested after 24 hours, passes negative hydrostatic test ASTM D4068, does not require any fabric, can bridge gaps up to 1/8 inch and adheres to materials such as cast iron and lead. Using an aramid polymer such as PPD-T (para-phenylenediamine terephethalamide) fiber in combination with the other components of the composition has demonstrated unexpected unique application and performance properties for the waterproofing membrane composition.

KEVLAR® is made by DuPont and refers to a p-aramid fiber based on poly(p-phenylene) terephthalamide. KEVLAR® is provided as a pulp product and as a cut fiber and it is highly preferred that the pulp product be used in the waterproofing membrane composition of the invention because of its demonstrated effectiveness.

Fibers of KEVLAR® consist of long molecular chains produced from poly(p-phenylene) terephethalamide which are highly oriented with strong interchain bonding. Fibers are available commercially in lengths from 4.5 mm to 0.5 inch. KEVLAR® pulp consists of a main fiber surrounded by many smaller attached fibrils resulting in a high surface area product. The diameter of the pulp fiber is typically about 12 micron (base diameter) and the length about 0.2 to 0.5 mm.

It has been found that the use of p-aramid pulp together with the other components provides a waterproofing membrane composition having superior enhanced over application and performance properties. The p-aramid pulp is incorporated in the composition in an amount of about 0.01 to 2 wt. %, preferably 0.1 to 2 wt. % of the composition.

NOMEX® is also made by DuPont and refers to m-aramid fibers based on poly (m-phenylene) isophthalamide. NOMEX is also provided as a cut fiber and a fibrid. The cut fiber is available in lengths of about 0.0625 inch to 0.25 inch. This invention covers the use of NOMEX as well as the KEVLAR® as discussed above. KEVLAR®, and especially KEVLAR® pulp, is preferred because of its demonstrated effectiveness.

The preferred p-aramid fiber is a short inert and highly fibrillated pulp with a length of about 0.05 to 1 mm, preferably 0.2 to 0.7 mm and most preferably 0.2 to 0.39 mm. The pulp has a specific gravity of about 1.45, a specific surface area of 7–11 $m^2$/g and a bulk density of about 3–7 lbs/$ft^3$.

Various embodiments of the present invention will now be illustrated by reference to the following specific examples. It is to be understood, however, that such examples are presented for purposes of illustration only, and the present invention is no way be deemed as limited thereby.

A preferred waterproofing membrane composition of the instant invention comprises (in % by weight):

|  | % | % by Weight of Total Composition |
|---|---|---|
| Part A |  |  |
| Aradur 76 | 100 | 16.6 |
| Part B |  |  |
| Ancarez 2364 | 5.25 | 0.85 |
| Araldite DY 3601 | 18.5 | 2.99 |
| Araldite 302-2 | 71.5 | 11.59 |
| Epodil 748 | 4.75 | 0.79 |
| Part C |  |  |
| Sand 1.5 mm | 92 | 61.7 |
| ground rubber | 1.5 | 1.04 |
| KEVLAR ® Pulp | 0.5 | 0.37 |
| Ultraflex | 2 | 1.34 |
| Titanox R-KB-2 | 4 | 2.68 |

The above composition comprising, by weight, 2.73 parts A, 2.66 parts B and 11 parts C was mixed together as described above and applied to a cement backerboard substrate using a notched trowel and then flattened using a flat edge of the trowel. The applied composition had the following properties.

Meets and exceeds all ANSI 118.10-1999 physical properties.

Passed negative hydrostatic test after 48 hrs. at a 2 foot water height. (ASTM D4068)

Flexible with a tensile elongation of 50%.

Shear bond strength to variable substrates such as concrete, wood, metals of >50 psi.

Tensile strength>800 psi.

Excellent non-sag and workability properties.

Passed flood test after 24 hours.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A waterproofing membrane composition which is strong, workable and easy to apply, flexible, passes ASTM D4068, and cures quickly allowing for flood testing after 24 hours at 70° F., comprising: a flexible epoxy resin; a flexible curing agent; an acrylate functional urethane resin epoxy flexibilizer; sand or other inert filler; and an effective amount of a poly(p-phenylene terephthalamide) polymer fiber and/or poly(m-phenylene isophthalamide) polymer fiber.

2. The composition of claim 1 wherein the composition further contains an epoxy reactive diluent.

3. The composition of claim 2 wherein the polymer fiber is poly(p-phenylene terephthalamide).

4. The composition of claim 2 wherein the epoxy reactive diluent is an aliphatic glycidyl ether.

5. The composition of claim 1, wherein the polymer fiber is poly(p-phenylene terephthalamide).

6. The composition of claim 5 wherein the polymer fiber is fibrillated.

7. A method of applying a waterproofing composition to a substrate comprising: providing a substrate to be waterproofed; applying a waterproofing membrane composition to the substrate surface; and curing the composition; wherein the waterproofing membrane composition comprises: a flexible epoxy resin; a flexible curing agent; an acrylate functional urethane resin epoxy flexibilizer; sand or other inert filler; and an effective amount of a poly(p-phenylene terephthalamide) polymer fiber and/or poly(m-phenylene isophthalamide) polymer fiber.

8. The method of claim 7 wherein the composition further contains an epoxy reactive diluent.

9. The method of claim 8 wherein the epoxy reactive diluent is an aliphatic glycidyl ether.

10. The method of claim 7, wherein the polymer fiber of the composition is poly(m-phenylene isophthalamide).

11. The method of claim 10 wherein the polymer fiber is fibrillated.

* * * * *